March 23, 1948. S. H. EDGE 2,438,389
HYDRAULIC SELECTOR VALVE MECHANISM FOR HYDRAULIC SERVOMOTORS
Filed Dec. 10, 1942 4 Sheets-Sheet 1

Inventor
Stanley Steward Edge
By Norris + Bateman
Attorneys

March 23, 1948.        S. H. EDGE        2,438,389
HYDRAULIC SELECTOR VALVE MECHANISM FOR HYDRAULIC SERVOMOTORS
Filed Dec. 10, 1942        4 Sheets-Sheet 2

Inventor
Stanley Howard Edge
By
Attorneys

March 23, 1948. S. H. EDGE 2,438,389
HYDRAULIC SELECTOR VALVE MECHANISM FOR HYDRAULIC SERVOMOTORS
Filed Dec. 10, 1942 4 Sheets-Sheet 4

Inventor
Stanley Howard Edge
By
Attorneys

Patented Mar. 23, 1948

2,438,389

UNITED STATES PATENT OFFICE 2,438,389

HYDRAULIC SELECTOR VALVE MECHANISM FOR HYDRAULIC SERVOMOTORS

Stanley Howard Edge, Lincoln, England

Application December 10, 1942, Serial No. 468,566
In Great Britain October 20, 1941

6 Claims. (Cl. 60—97)

This invention relates to hydraulic mechanism for controlling the operations of machinery and machine components of all kinds and has for its object to provide arrangements of control or selector valve mechanism applicable to hydraulic actuating systems wherein the power developed in a continuously flowing hydraulic circuit is utilised to apply a graduated pressure for effecting such operations as starting, stopping, speed variation, control of gun turrets, the elevation of guns, the steering of vehicles and the control of clutches as well as a variety of other applications demanding a multiplicity of operational motions combined with delicacy of control.

The invention consists in hydraulic control mechanism comprising a power operated hydraulic circuit, an external actuated controlling reaction valve, a number of hydraulic servomotors, means actuated by said reaction valve to divert the power available in the hydraulic circuit to operate the said servomotors and a selector device constructed to enable the said servomotors to be independently operated and controlled.

According to the preferred form of the invention a control device for hydraulic operating mechanism comprises a shut-off valve adapted to interrupt a hydraulic circuit, a number of selector valves each controlling the flow of fluid to a hydraulic servomotor, common operating means adapted to close the shut-off valve and simultaneously operate any one or more of said selector valves for the purpose of diverting the power available in the circuit to a selected servomotor or motors.

Figure 1:
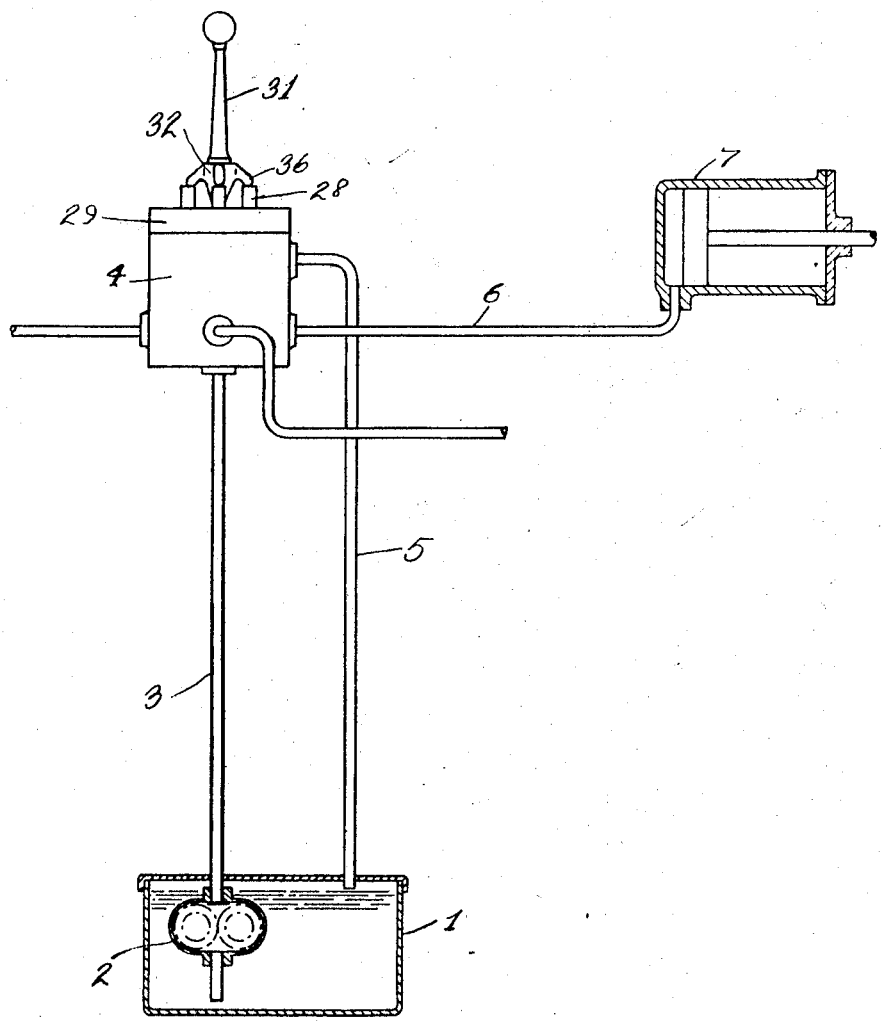
Figure 2:
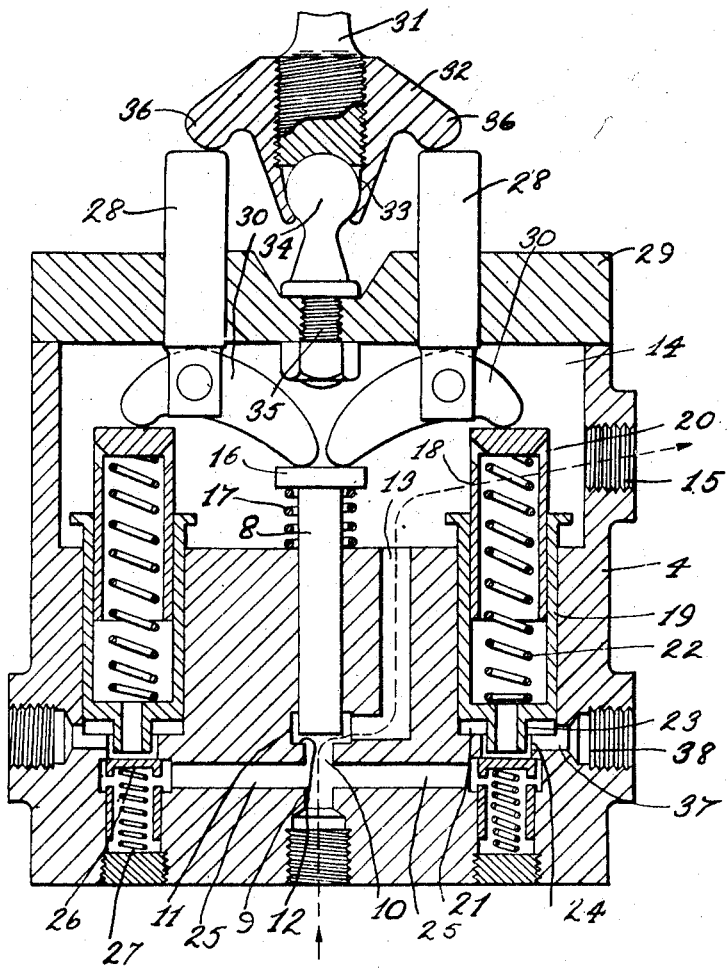
Figure 3:
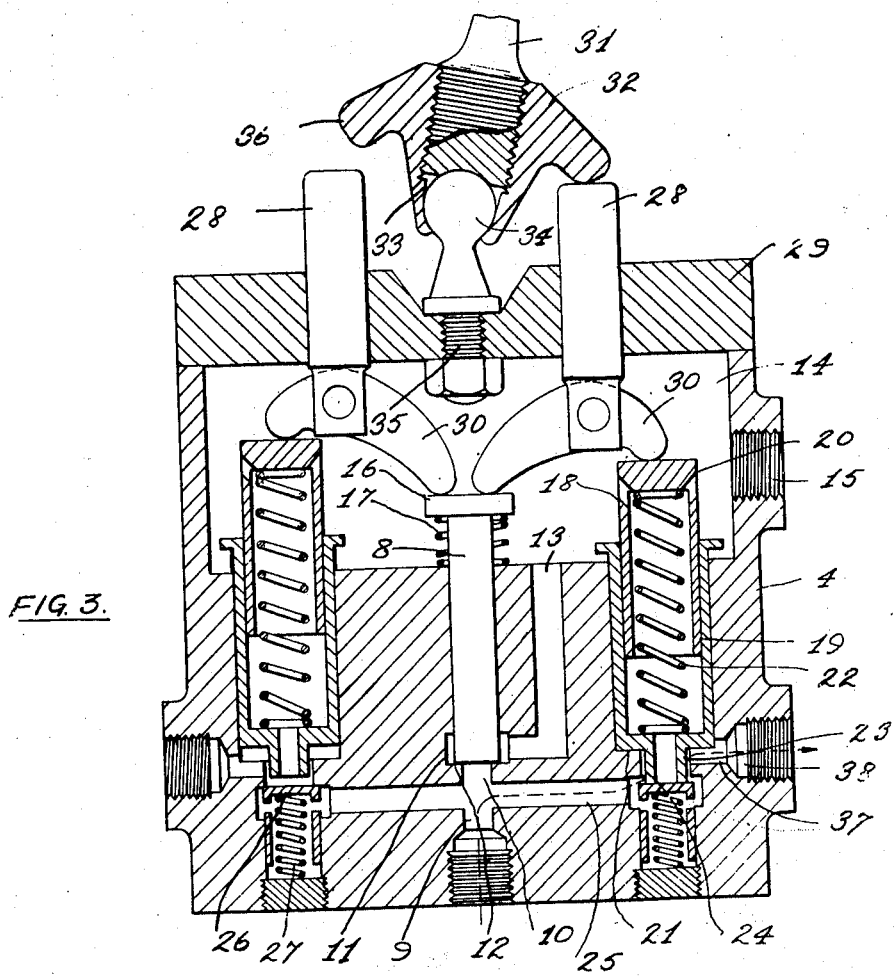
Figure 4:
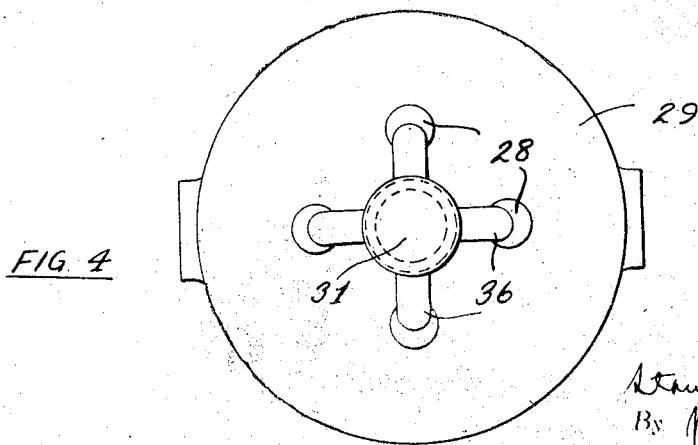

Reference will now be made to the accompanying drawings which illustrate by way of example arrangements according to the invention and in which Fig. 1 is a diagram showing a hydraulic circuit with a control device according to the invention applied thereto, Fig. 2 is a sectional elevation of a shut-off and selector valve device in the inoperative position, Fig. 3 is a sectional view similar to Fig. 2 showing the valves in the operative positions, Fig. 4 is a plan of the control valve shown in Figs. 2 and 3.

Figure 5:
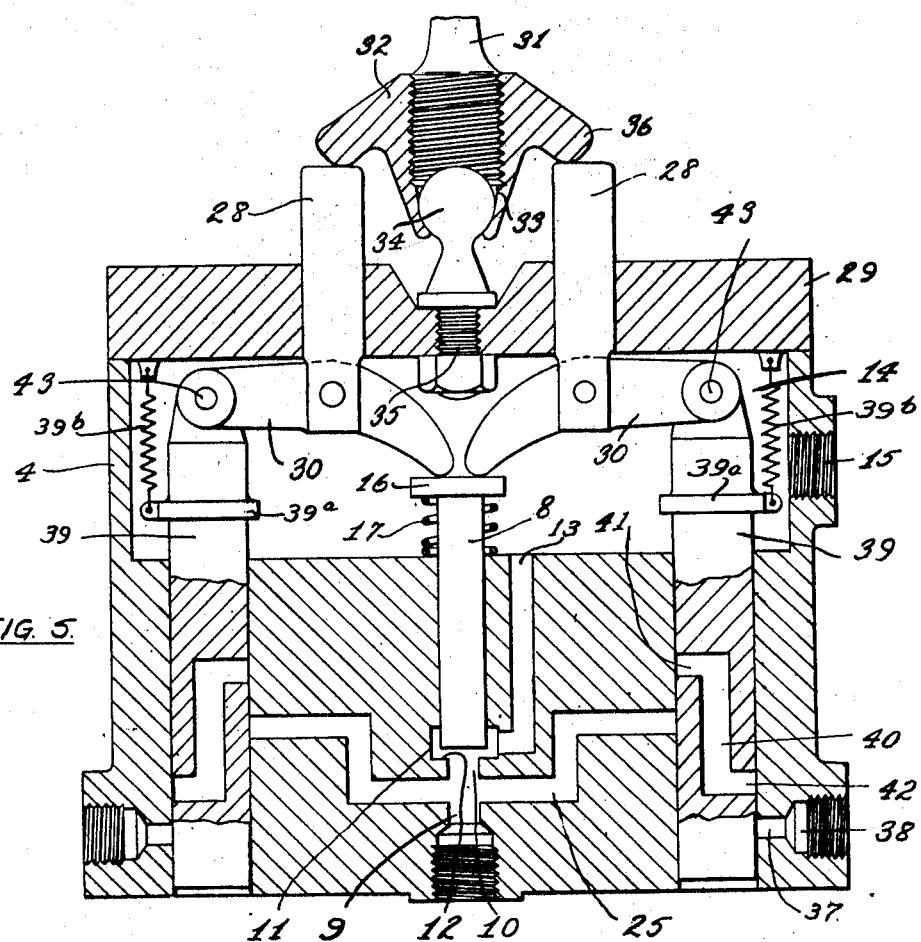

Fig. 5 is a sectional view of a modified control valve arrangement.

Referring first to Fig. 1 the apparatus provided by the invention comprises a reservoir 1 within which is disposed a pump 2 which normally causes circulation of liquid, preferably oil, from the reservoir 1 through an outward conduit 3, valve housing 4 and return conduit 5, the arrangement of the valves in the housing 4 being, as hereinafter described, such that when the valve is actuated the return conduit 5 is completely closed and the pressure built up by the pump is diverted through one of a number of conduits 6 to a servomotor through which a graduated effort is transmitted to the device or mechanism under control. As it frequently happens that a device under control requires power impulses for different purposes at different times, it is desirable to provide simple means whereby the appropriate diversion of power can be quickly and effectively made. One form of mechanism for achieving this object is enclosed by the valve housing 4 and is shown in detail in Figs. 2, 3 and 4. This valve housing contains a centrally disposed, axially movable shut-off valve 8 and a number of selector valves arranged radially around the said shut-off valve. Liquid delivered by the pump through conduit 3 enters the valve housing 4 through a port 9 communicating by a short passage 10 with a chamber 11 containing a seating 12 for the shut-off valve 8, this chamber 11 communicating by a passage 13 with a chamber 14 having a port 15 from which liquid normally leaves the housing and returns through conduit 5 to the reservoir for recirculation. The shut-off valve member 8 has a head 16 beneath which bears a spring 17 which normally holds the valve in the open position shown in Fig. 2.

Each selector valve consists of a pair of sleeves 18 and 19, the sleeve 18 being provided with ports 20 and being slidably mounted within the sleeve 19 which is itself slidable within a socket 21 formed in the valve housing 4. The two sleeves 18 and 19 are normally urged apart by the action of a spring 22. The base of sleeve 19 has a hollow projection 23 which enters a passage 24 of greater diameter, this passage communicating through a radial passage 25 with the inlet port 9. In the arrangement illustrated there are four selector valves, 18, 19 arranged equidistantly around the shut-off valve 8 and capable of communicating with the inlet port 9 by four radial passages 25. Communication between each passage 24 and each passage 25 is normally cut off by a valve 26 held on its seat, as shown in Fig. 2, by a spring 27. The valves are operated by plungers 28 movable axially in the cover 29 of the housing 4. Each plunger carries pivotally at its lower end a beam 30, one end of which rests upon the upper end of the selector valve sleeve 18 and the other end rests upon the head 16 of the shut-off valve and as will be seen from the plan, Fig. 4, these beams lie at right angles the one to another, all four normally resting idly upon the head 16 of the shut-off valve. To enable the valves to be operated there is provided a handle 31 which in its normal and inoperative position is vertical as shown in Fig. 2. This handle is fixed to a boss 32 which has a partially spherical socket 33 in its base adapted to engage over a fixed ball element 34 mounted at 35 in the centre of the cover 29. The boss 32 has four radial arms 36 each of which bears upon the head of one of the plungers 28. The port 15 is connected by the return conduit 5 to the reservoir 1 and each passage 24 and the base of each socket 21 communicate by a short passage 37 and a port 38 with a conduit 6 connected to one of the group of hydraulic servomotors controlled by the valve mechanism contained within the housing 4.

To operate the valve above described the handle 31 is moved to an inclined position, as shown in Fig. 3, this movement causing depression of one of the plungers 28 and closure of the shut-off valve 8. Normally, the circulating fluid takes the path indicated by the broken line from port 9 into chamber 14 and thence back to the reservoir, a certain proportion of this liquid passing through the ports 20 and following the course of the broken line to the servo cylinder 7 but not being under pressure this liquid can do no work. When the plunger 28 is depressed, however, it also depresses the ported sleeve 18 compressing the spring 22 until the sleeve 19 is also depressed to bear upon and open the valve 26 thereby allowing the liquid under pressure, which can no longer pass the shut-off valve 8, to flow through passage 25 to port 38 and the servomotor which is thereby operated. The interposition of the spring 22 between the valve sleeves 18 and 19 gives a travel proportional to the applied effort which in turn produces a proportional pressure in the servomotor cylinder. This servomotor is only operated so long as the handle 31 is held in the position shown in Fig. 3 or in one of the three other possible inclined positions. As soon as the handle 31 is released, the springs 17 and 22 restore the valve members to the positions shown in Fig. 2 and the hydraulic circuit is restored without transmission of effort to any of the servomotors.

The four point power distributing valve constructed and operating as above described is suitable to control the operations of a gun turret for example. Left or right hand movement of the arm 31 would give left or right hand rotation of the turret and backward or forward movement of the arm 31 would be used to give elevation or depression of the gun.

In the modified arrangement shown in Fig. 5, the shut-off valve 8 is arranged and operated in the same manner as described with reference to Figs. 2 and 3 but instead of employing a selector valve consisting of cooperating sleeves, the arrangement of Fig. 5 employs a single valve member 39 having a passage 40 and communicating ports 41 and 42 to cooperate with the passage 25 and port 37 respectively. This valve member, when in the position shown, shuts off the end of passage 25 and enables the hydraulic fluid to circulate through passage 10, chamber 11 and passage 13 back to the chamber 14 from which the fluid returns to the reservoir 1 as already described. The head of each valve member 39 is pivotally connected at 43 to a beam 30 operated by a plunger 28, and when the respective plunger is depressed, the chamber 11 and passage 13 are shut off and the ports 41 and 42 are brought into coincidence with passage 25 and port 37 respectively, the latter communicating with the passage 38 and conduit leading to the respective servomotor. A shoulder 39$^a$ on each valve member 39 limits its downward movement to ensure coincidence of its ports with the end of passage 25 and port 37 respectively.

When the pressure on a plunger 28 is relaxed, spring 17 restores the shut-off valve 8 to the open position shown, and a spring 39$^b$ connecting each valve member 39 to the fixed cover 29, elevates the valve member which has been depressed and restores it to the position shown.

The spring 39$^b$ for each valve member 39 is weaker than the spring 17 for the shut-off valve 8 when a valve member 39 and the shut-off valve 8 are both in lowered position, in order that the shut-off valve 8 may be first restored to normal open position and enable the circuit through chamber 14 to be resumed before the valve member 39 shuts off the end of passage 25, thereby permitting fluid to return to the passage 25 from the respective servomotor and to return to the hydraulic circuit through the passage 13.

I claim:

1. Hydraulic control mechanism comprising a valve housing having an inlet and an outlet, means connected to the inlet and outlet for circulating fluid under pressure through said housing, a number of hydraulic servomotors connected to said housing, a shut-off valve interposed between the inlet and outlet of the housing for controlling the circulation of fluid therethrough, said shut-off valve being normally urged to open position, a number of selector valves disposed operatively in positions parallel to said shut-off valve and each communicating with the inlet side of the shut-off valve and adapted to control the flow of pressure fluid to one of said servomotors, a number of depressible plungers each having a beam pivoted to its lower end, one end of said beam bearing upon the shut-off valve and the other end of said beam bearing upon a selector valve, a common actuating member adapted to engage selectively any one of said plungers to cause diversion of pressure fluid from the inlet to the appropriate servomotor, and spring means for restoring the parts to inoperative positions after operation.

2. Hydraulic control mechanism comprising a valve housing having an inlet and an outlet, means connected to the inlet and outlet for circulating fluid under pressure through said housing, a number of hydraulic servomotors connected to said housing, a shut-off valve interposed between the inlet and outlet of the housing for controlling the circulation of fluid therethrough, said shut-off valve being normally urged to open position, a number of selector valves disposed operatively in positions parallel to said shut-off valve and each communicating with the inlet side of the shut-off valve and adapted to control the flow of pressure fluid to one of said servomotors, a universally pivoted lever mounted on said housing, a number of depressible plungers projecting out of said housing, any one of which is operative selectively by inclination of said lever, a beam pivotally mounted on the inner end of each plunger, one end of said beam bearing upon the shut-off valve and the other end of said beam operating a selector valve, and spring means for restoring the parts to inoperative positions after operation.

3. A control device for hydraulic operating mechanism, comprising a valve housing having an inlet and an outlet adapted to be connected to the outward and return conduits of a hydraulic circuit, and passages adapted to be connected to a plurality of hydraulic servomotors, an axially movable shut-off valve disposed within said housing between the inlet and outlet thereof and normally urged to open position, a plurality of axially movable selector valves arranged around said shut-off valve and connecting with the inlet side of the shut-off valve, said selector valves controlling the passages to said servomotors, a universally mounted operating lever carried by said housing, a number of depressible plungers projecting out of said housing and operable by inclination of said lever, a beam mounted pivotally on the inner end of each plunger and adapted to operate the shut-off valve and a selector valve, and spring means for restoring the parts to normal positions after operation.

4. A control device according to claim 3, wherein each of said selector valves comprises relatively movable members between which said spring means is interposed, said members being movable in parallelism with said shut-off valve.

5. A control device according to claim 3, wherein said selector valves each comprises a pair of telescopic sleeves which are relatively slidable one within the other, and between which said spring means is interposed, said sleeves being movable in parallelism with the axis of said shut-off valve.

6. A control device according to claim 3, wherein said selector valves each comprises a valve member for controlling communication between the outward conduit of the hydraulic circuit and the respective servomotor, and a pair of telescopic members operable by the respective beam to open said valve member, said telescopic members having ports adapted to communicate with the return conduit of the hydraulic circuit and the respective servomotor, the latter port being controlled by the operation of said telescopic members to open said valve member.

STANLEY HOWARD EDGE.

REFERENCES CITED

The following references are of record in the file of this patent:

UNITED STATES PATENTS

| Number | Name | Date |
|---|---|---|
| 978,579 | Grebel | Dec. 13, 1910 |
| 2,075,917 | Vorech | Apr. 6, 1937 |
| 2,243,364 | Trautman | May 27, 1941 |
| 2,336,715 | Casler | Dec. 14, 1943 |
| 2,349,069 | Ashton | May 16, 1944 |

FOREIGN PATENTS

| Number | Country | Date |
|---|---|---|
| 443,448 | Great Britain | 1936 |
| 371,757 | Italy | 1939 |